No. 896,160. PATENTED AUG. 18, 1908.
R. E. ROSEWARNE.
EXPANSIBLE PULLEY.
APPLICATION FILED APR. 13, 1906.
2 SHEETS—SHEET 2.
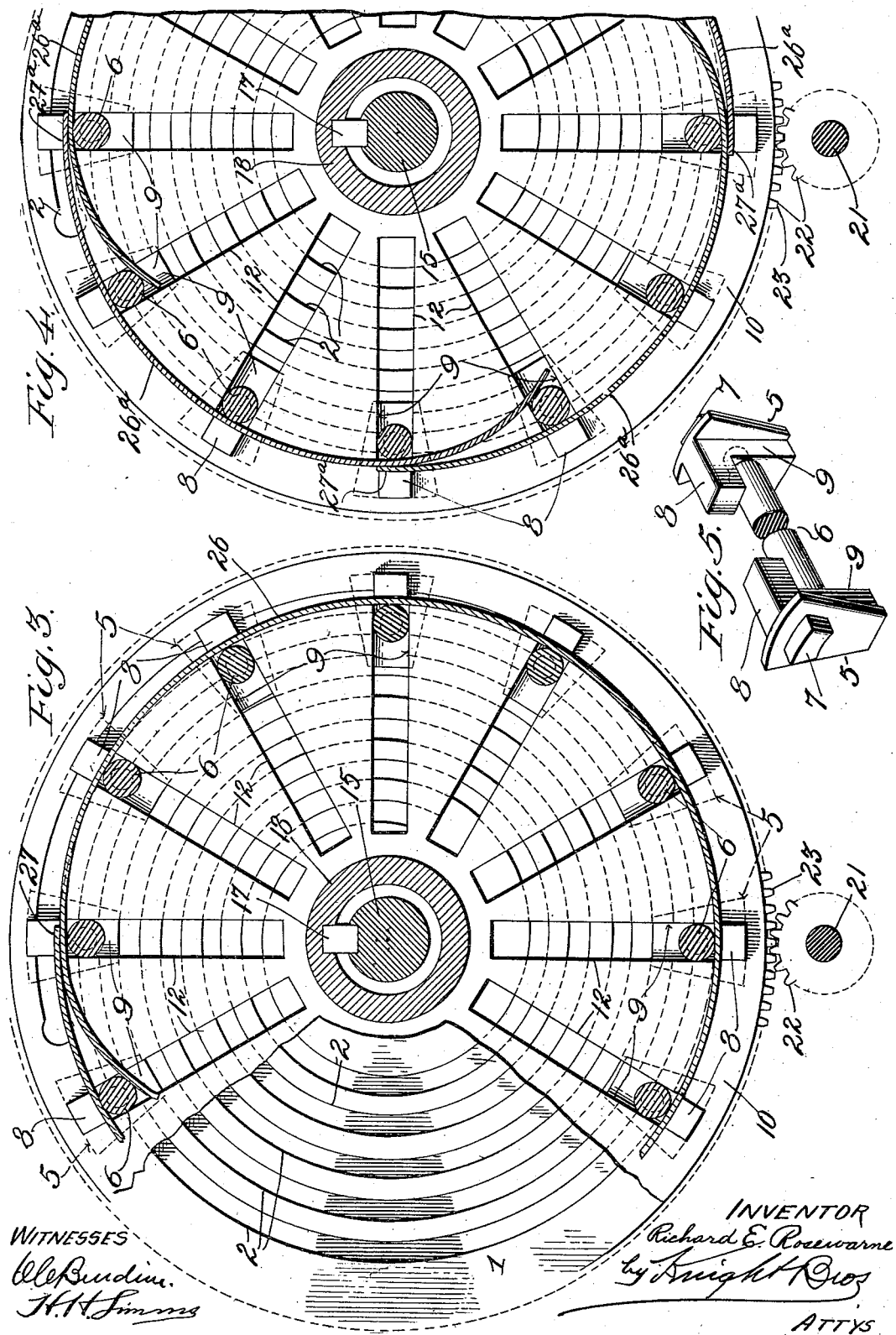
WITNESSES
INVENTOR
Richard E. Rosewarne
by Knight Bros
ATTYS

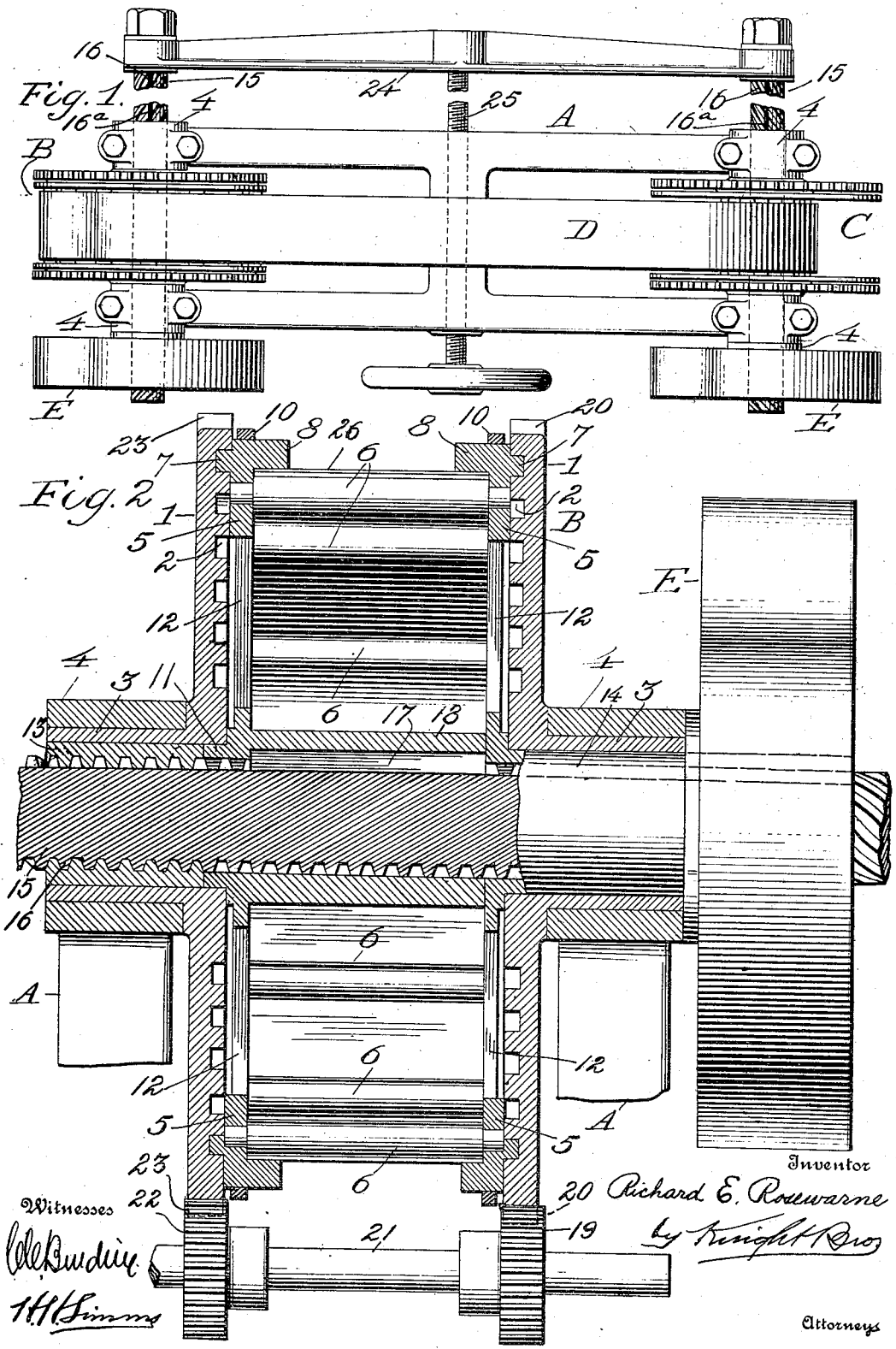

UNITED STATES PATENT OFFICE.

RICHARD E. ROSEWARNE, OF COVINGTON, KENTUCKY, ASSIGNOR TO THE MILLER, DU BRUL AND PETERS MANUFACTURING COMPANY, OF CINCINNATI, OHIO, A CORPORATION OF OHIO.

EXPANSIBLE PULLEY.

No. 896,160.   Specification of Letters Patent.   Patented Aug. 18, 1908.

Application filed April 13, 1906. Serial No. 311,530.

*To all whom it may concern:*

Be it known that I, RICHARD E. ROSEWARNE, a citizen of the United States, residing at Covington, in the county of Kenton, State of Kentucky, have invented a new and useful Improvement in Expansible Pulleys, of which the following is a specification.

This invention relates to expansible pulleys and more particularly to pulleys of this type adapted for variable speed mechanisms.

An object of the invention is to provide an expansible pulley having a substantial bed which will create a minimum wear upon the belt.

Other and further objects will appear in the following description and will be more particularly pointed out in the appended claims.

In the drawings, Figure 1 is a top plan view of a variable speed mechanism embodying my invention. Fig. 2 is an axial section through the pulley. Fig. 3 is a transverse section through the pulley, parts being broken away. Fig. 4 is a partial transverse section of another embodiment of my invention. Fig. 5 is a detail perspective view of one of the supports.

Referring more particularly to the drawings, A indicates a frame, B and C expansible pulleys journaled in frame A, D a driving belt and E driving or driven pulleys turning with the expansible pulleys B and C.

Each expansible pulley embodies two outer disks 1 each provided with a spiral guide groove 2 on its inner face and with a central hollow boss 3 on its outer face, said bosses forming the spindle of the pulley and turning in bearings 4 on the frame A.

Connecting the inner or opposed faces of the disks is a series of bars or supports each of which comprises two end pieces 5 forming the bearings for a roller 6 (see Fig. 5). The end pieces 5 have arcuate guide flanges or projections 7 which travel in the spiral grooves 2 of the disks 1, the flanges on adjacent supports being in different positions, that is, the heights of the arcuate flanges on the supports increase from the support having the flange which is located at that part of the groove nearest the center of the disk, thus maintaining the concentricity of the pulley. The end pieces are also provided with projections 8 which overhang the ends of the roller 6 of the support and are slightly spaced therefrom to permit a rim, to be hereinafter described, to be guided between the roller 6 and the overhanging projection 8. The end pieces are further provided on opposite sides with controlling faces 9, the functions of which will hereinafter appear. There is also provided a pair of holding disks 10, one of which has a central hollow boss 11 fitted within the inner end of one of the hollow spindle bosses 3 of one of the outer disks; and the other of which has a central hollow spindle boss 14 fitted within the hollow spindle boss 3 of the other outer disk, the hollow boss 14 extending beyond the bearing 4 and carrying the driving or driven pulley E which is secured thereto. The holding disks 10 are provided with radial slots 12, the walls of each of which engage the controlling faces 9 of an end piece of the supports.

The boss 3 of one of the outer disks 1 has rigidly secured therein an internally threaded bushing 13. Through this bushing and the bosses of the disks 10, extends an adjuster 15 which is provided with threads 16 to work on the internal threads of bushing 13. Said screw adjuster 15 is also provided with a longitudinal groove 16$^a$ to receive a key or feather 17 secured to a sleeve 18 which surrounds the shaft between the holding disks 10, thereby spacing the latter, and being secured to said disks 10. It is apparent that the pulley E, adjuster 15 and the inner disks 10 will rotate together, owing to key or feather 17, and that the outer disk 1 carrying the internal thread will, owing to the engagement of the threads on the internal bushing with the adjuster, rotate with said parts. The other or driven disk 1 receives its rotation from a pinion 19 gearing with peripheral gear 20 on said disk and mounted on a counter shaft 21 which is journaled in the frame A below the expansible pulley and carries a pinion 22 meshing with a gear 23 on the periphery of the driving disk 1. At one end, the adjusters 15 of the two expansion pulleys turn in the ends of a bar 24 to which the end of a screw 25 is secured, the screw having a journal and nut in the frame A.

When the screw 25 is rotated in either direction, the bar 24 simultaneously moves both adjusters 15 axially. The screw threads of the two pulleys are so disposed that when one pulley is expanded, the other is contracted. Upon the axial movement of the adjusters 15, the threads 16 thereon cause each adjusting disk 1 to be rotated or turned, said adjusting disk 1 transmitting its motion through counter shaft 21 to the driven disk 1. As both disks 1 rotate, the holding disks 10 are held stationary by means of the feather 17 fitting in the longitudinal groove 16ª, and the arcuate guide flanges 7 of the supports travel on the spiral guides 2 to and from the axis of the drum, being held against rotation with said disks 1 by disks 10.

In the embodiment of my invention, as shown in Fig. 3, a continuous expansible bed is formed of a flexible rim 26 secured at one end at 27 to the overhanging projections 8 of one of the supports and passed between the projections 8 and roller 6 of each support, the other end being free, and passing beneath the secured end. When the supports are moved to and from the axis of the pulley, the rim being flexible moves or slides on the supports to contract and expand the pulley, the rollers 6 acting to reduce the friction, and the overhanging projections 8 acting to hold said rim to the pulleys. The rim forms a substantial bed for the belt and prevents excessive wear thereon.

Instead of making the rim of one continuous strip, it may be made of sections as shown in Fig. 4. In this embodiment each section 26ª is secured to one support as at 27ª and extends over one or more of the supports and beneath the end of the adjacent section 26ª.

While the mechanism herein described for moving the supports has many advantages, I desire it to be understood that I may use any other means for moving the supports to and from the axis of the drum to contract and expand the pulley.

It is apparent that the pulley may be expanded and contracted during its rotation.

Having thus described my invention, what I claim and desire to secure by Letters Patent is:

1. The combination with a pair of spiral guides, of supports movable on the guides, an axially movable screw engaging one of the guides, and gearing connecting the guides to cause their simultaneous movement.

2. The combination with a pair of grooved disks, supports movable on the disks, radially slotted disks engaging said supports, an axially movable screw engaging one of the grooved disks, gear teeth on the periphery of the grooved disks, a counter shaft, and pinions carried by the counter shaft and engaging the toothed peripheries of the grooved disks.

3. In an expansible pulley, a continuous bed, rollers for carrying said bed, spiral guides on opposite sides of the bed, roller-supports movable in said guides, and an adjuster movable longitudinally to expand and contract the continuous bed by means of the roller supports.

4. In an expansible pulley, an adjustable continuous bed formed of a plurality of overlapping sections, a plurality of roller-carrying supports upon which the continuous bed is mounted, said supports being provided with arcuate flanges; and a pair of spiral guides for slidably mounting said supports by means of said arcuate flanges; said arcuate flanges being arranged in such varying positions on the supports as to make the continuous bed concentric with the center of the pulley for every size to which it may be adjusted.

5. In an expansible pulley, the combination with the continuous bed, of a plurality of rollers upon which the continuous bed is adapted to run, a plurality of supports for said rollers provided with overhanging projections, a pair of spiral guides within which said supports are adapted to be moved, means for holding the supports and bed against rotation with the guides, and an adjuster sliding parallelly to the axis of the rotating guides whereby the pulley is expanded and contracted.

6. In an expansible pulley, a plurality of supports, means for moving the supports to and from the axis of the pulley, and a continuous expansible bed having sliding connections with said supports, said supports being provided with projections overhanging the bed.

7. In an expansible pulley, a plurality of supports provided with overhanging projections, a continuous expansible bed mounted upon said supports and beneath the overhanging projections, and means sliding along the axis of the pulley, for moving the supports to and from the axis of the pulley.

8. In an expansible pulley, the combination with the guides, of a plurality of supports provided with overhanging projections on said guides, rollers mounted in said supports in such manner as to form a groove-like periphery to the expansible pulley, and a rim slidable in the groove thus formed.

9. In an expansible pulley, the combination with the guides, of a plurality of supports on said guides, each of said supports being provided with an overhanging projection, a roller mounted in each pair of supports and positioned immediately below the overhanging projections of said supports in such manner as to provide a rim supporting space between said roller and projections, and a rim composed of sections adjustably mounted in the spaces so provided in a plurality of said paired supports.

10. In an expansible pulley, the combination with the guides, of a plurality of rollers, supports therefor on said guides, said supports being provided with projections overhanging the ends of the rollers, and a rim movable between said projections and the rollers.

11. In an expansible pulley, the combination with a continuous bed of a pair of guides provided with interiorly threaded hubs and an exteriorly threaded adjuster movable through said hubs to cause said guides to be rotated relatively to the bed, and means holding the bed against rotation with the guides.

12. In an expansible pulley, a plurality of rollers, a plurality of supports therefor provided with projections overhanging said rollers in such manner as to provide spaces between the rollers and projections, a continuous expansible bed sliding in the spaces thus formed, and means for moving the supports to and from the axis of the pulley.

13. In an expansible pulley, the combination with the guide disks having central spindle bosses, and the supports, of the holding disks having central spindle bosses fitting in the spindle bosses of the guide disks, a pulley secured to the spindle boss of one of the holding disks, and a screw having a feather and groove connection with one pair of the disks and a threaded connection with the other pair of disks.

The foregoing specification signed at Cincinnati, Ohio this 30 day of March, 1906.

RICHARD E. ROSEWARNE.

In presence of two witnesses—
H. WHYRICH,
F. BROERMAN.